US010641164B2

United States Patent
Nakada et al.

(10) Patent No.: US 10,641,164 B2
(45) Date of Patent: May 5, 2020

(54) INTERNAL COMBUSTION ENGINE

(71) Applicant: HONDA MOTOR CO., LTD., Minato-ku, Tokyo (JP)

(72) Inventors: Kazutaka Nakada, Wako (JP); Azuki Ichikawa, Wako (JP); Yuhei Noguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 11 days.

(21) Appl. No.: 16/140,057

(22) Filed: Sep. 24, 2018

(65) Prior Publication Data

US 2019/0101051 A1  Apr. 4, 2019

(30) Foreign Application Priority Data

Oct. 3, 2017 (JP) .................................. 2017-193357

(51) Int. Cl.
*F02B 37/18* (2006.01)
*F02B 39/00* (2006.01)
(Continued)

(52) U.S. Cl.
CPC .............. *F02B 37/18* (2013.01); *F01N 3/035* (2013.01); *F02B 39/005* (2013.01);
(Continued)

(58) Field of Classification Search
CPC ........ F02B 37/18; F02B 39/005; F02B 33/44; F02B 37/186; F02B 37/00; F02D 41/0007; F02D 2200/0406; F01N 3/035; F01N 2240/36; F01N 2260/20; F01N 2340/04; F01N 2340/06; F01N 3/10; F01N 3/2882; F01N 5/04; F01N 13/08; F05D 2220/40
(Continued)

(56) References Cited

U.S. PATENT DOCUMENTS 3,456,437 A * 7/1969 Kasaczun ................ F02C 6/12
60/600
5,186,005 A * 2/1993 Yoshioka .............. F02B 37/007
60/600
(Continued)

FOREIGN PATENT DOCUMENTS

JP     H046541 U      1/1992
JP     2006316657 A   11/2006
(Continued)

OTHER PUBLICATIONS

English translation of Notice of Reasons for Refusal for JP Application No. 2017-193357, dated May 7, 2019.
(Continued)

*Primary Examiner* — Hoang M Nguyen
(74) *Attorney, Agent, or Firm* — Armstrong Teasdale LLP

(57) ABSTRACT

An internal combustion engine equipped with a turbocharger (5) including a turbine (40) and a compressor (27) that are arranged in a coaxial relationship, the internal combustion engine includes an exhaust pipe (41) extending from an outlet (59) of the turbine along a side of the compressor, an actuator (90) attached to a part of the compressor for controlling a flow path of the turbocharger, and a fluid pipe (76, 79) conducting fluid and extending through a space defined between the exhaust pipe and the actuator.

8 Claims, 6 Drawing Sheets

(51) Int. Cl.
  *F02D 41/00* (2006.01)
  *F01N 3/035* (2006.01)

(52) U.S. Cl.
  CPC .. *F02D 41/0007* (2013.01); *F02D 2200/0406* (2013.01); *F05D 2220/40* (2013.01)

(58) Field of Classification Search
  USPC .............................................. 60/605.1–612
  See application file for complete search history.

(56) References Cited

U.S. PATENT DOCUMENTS

| | | | | |
|---|---|---|---|---|
| 7,762,068 | B2* | 7/2010 | Tabata | F02D 41/0007 60/608 |
| 2015/0226108 | A1* | 8/2015 | Vroman | F28F 9/027 60/605.2 |
| 2017/0248087 | A1* | 8/2017 | Reisenberger | F02D 11/105 |

FOREIGN PATENT DOCUMENTS

| | | |
|---|---|---|
| JP | 2007-85292 A | 4/2007 |
| JP | 2012241533 A | 12/2012 |
| JP | 2014163291 A | 9/2014 |

OTHER PUBLICATIONS

English translation of Written Argument for JP Application No. 2017-193357, dated Jun. 26, 2019.
English translation of Written Amendment for JP Application No. 2017-193357, dated Jun. 26, 2019.
English translation of Decision to Grant a Patent for JP Application No. 2017-193357, dated Aug. 13, 2019.
JP Notice of Reasons for Refusal for related application 2017-193357 dated Apr. 24, 2019; 6 pp.

\* cited by examiner

INTERNAL COMBUSTION ENGINE

TECHNICAL FIELD

The present invention relates to an internal combustion engine equipped with a turbocharger.

BACKGROUND ART

In a known internal combustion engine, a turbocharger is attached to the engine with a central axial line of the turbocharger extending in parallel with the cylinder row direction of the engine, and a catalytic converter included in the exhaust pipe extends from an outlet end of the turbine of the turbocharger in an oblique direction toward the side of the compressor of the turbocharger. See JP2007-85292A, for instance. This arrangement allows the catalytic converter to be positioned in a space created under the turbocharger so that the catalytic converter and the turbocharger can be favorably accommodated in a limited space of the engine room.

However, the catalytic converter is known to emit a significant amount of heat during the operation of the engine so that the compressor which is positioned directly above the catalytic converter is exposed to the heat from the catalytic converter. A turbocharger is typically provided with a wastegate valve for controlling the flow of exhaust gas in the turbine. An actuator for the wastegate valve is typically attached to the housing of the compressor, and is connected to the wastegate valve via a relatively long linkage in order to protect the actuator from the heat of the turbine. When the catalytic converter is positioned directly under the actuator or otherwise located near the actuator, the heat from the catalytic converter as well as the heat from the turbine may adversely affect the actuator. Even if the exhaust pipe does not include the catalytic converter, the heat from the exhaust pipe may adversely affect the actuator if the exhaust pipe is located near the actuator.

SUMMARY OF THE INVENTION

In view of such a problem of the prior art, a primary object of the present invention is to provide an internal combustion engine equipped with a turbocharger which can prevent or reduce transfer of heat from the exhaust pipe to an actuator for controlling a gas flow in the turbine of the turbocharger.

A second object of the present invention is to provide an internal combustion engine equipped with a turbocharger which can prevent or reduce transfer of heat from the turbine of the turbocharger.

To achieve such an object, the present invention provides an internal combustion engine equipped with a turbocharger (5), the turbocharger including a turbine (40) and a compressor (27) that are arranged in a coaxial relationship, the internal combustion engine comprising: an exhaust pipe (41) extending from an outlet (59) of the turbine along a side of the compressor; an actuator (90) attached to a part of the compressor for controlling a flow path of the turbocharger; and a fluid pipe (76, 79) conducting fluid and extending through a space defined between the exhaust pipe and the actuator.

Owing to the presence of the fluid pipe between the exhaust pipe and the actuator, the heat emitted from the exhaust pipe can be effectively shielded by the fluid pipe. Thus, the transfer of heat from the exhaust pipe to the actuator can be effectively prevented or reduced. For this purpose, it suffices for the fluid pipe to be located so as to block rays emanating from the exhaust pipe from reaching the actuator in a substantial manner. The heat transferred to the fluid pipe can be removed by the fluid conducted by the fluid pipe so that the fluid pipe is prevented from excessively rising in temperature.

The fluid pipe may be an intake pipe connected to an outlet of the compressor.

Because the intake pipe connected to the outlet of the compressor is positioned adjacent to the actuator, the intake pipe can be extended between the actuator and the exhaust pipe without adding any additional length to the intake pipe.

Preferably, the exhaust pipe extends obliquely from the outlet of the turbine, and passes along a lower side of the compressor, and the intake pipe includes an upstream part (76) extending downward from the outlet of the compressor, and a downstream part (79) extending away from the turbine, the actuator being positioned above the downstream part and on a side of the upstream part remote from the compressor.

Thus, the actuator can be protected both from the heat from the turbine and the heat from the exhaust pipe.

Preferably, the turbocharger comprises a turbine housing (51) accommodating a turbine wheel (56) of the turbine therein and a compressor housing (52) accommodating a compressor wheel (57) of the compressor therein, wherein the upstream part of the intake pipe consists of a tubular part integrally formed with the compressor housing, and the actuator is supported by the compressor housing via a bracket (85) integrally formed with the compressor housing.

Thereby, the actuator and the intake pipe can be assembled to the compressor without any difficulty in spite of a relatively poor accessibility to the part surrounding the compressor.

According to a preferred embodiment of the present invention, the actuator includes a case (91) attached to the bracket of the compressor housing, a drive rod (92) extending from the case toward the turbine, and a drive unit (93) received in the case and configured to axially actuate the drive rod, the bracket comprising a plate member having a major plane extending substantially perpendicularly to an axial line of the turbocharger, the case being attached to the bracket such that the drive unit is disposed on a side of the bracket remote from the turbine.

Thereby, the bracket protects the drive unit from the heat of the turbine.

More preferably, the bracket has an opening (95) formed therein, and the case of the actuator is attached to the opening, the drive rod of the actuator extending through the opening from the drive unit toward the turbine.

Thereby, the drive unit can be particularly favorably protected from the heat of the turbine, and the assembly work for the actuator can be simplified.

The exhaust pipe may include a catalytic converter (41).

Thereby, the catalytic converter can be positioned in a space-efficient manner.

An end of the drive rod remote from the case may be connected to a wastegate valve of the turbine.

Owing to the advantageous positioning of the actuator, even when the end of the drive rod remote from the case is connected to the wastegate valve which is known to be subjected to extreme heat, the actuator is protected from the heat.

The present invention thus provides an internal combustion engine equipped with a turbocharger which can prevent or reduce transfer of heat from the exhaust pipe and/or the turbine to an actuator for controlling a gas flow in the turbine of the turbocharger.

BRIEF DESCRIPTION OF THE DRAWING(S)

DESCRIPTION OF THE PREFERRED EMBODIMENT(S)

An internal combustion engine of a vehicle is described in the following with reference to the appended drawings as a preferred embodiment of the present invention. The directions mentioned in the following disclosure are based on the viewpoint of a driver of the vehicle.

Figure 1:
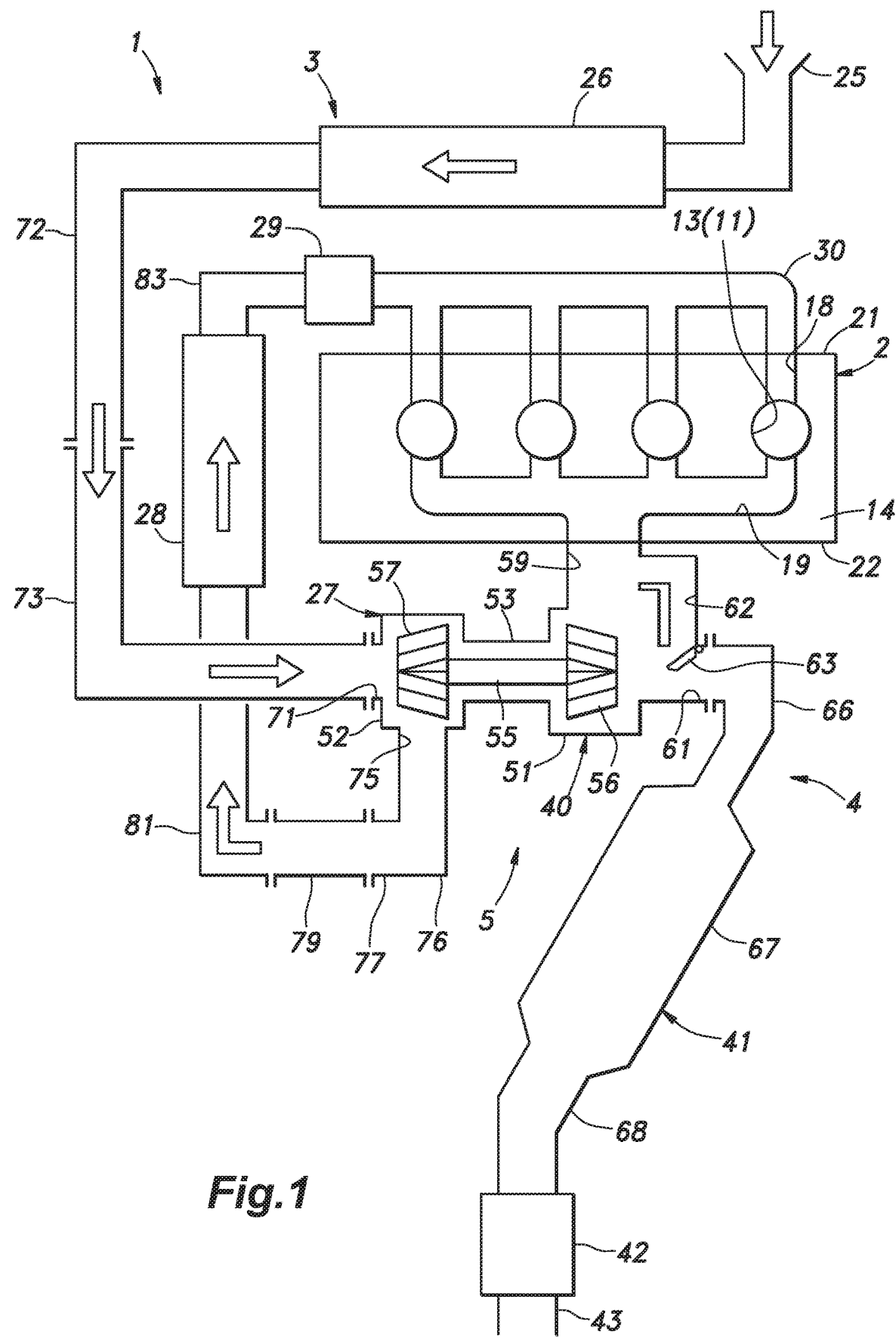
FIG. 1 is a schematic diagram of an internal combustion engine according to an embodiment of the present invention.
Figure 2:
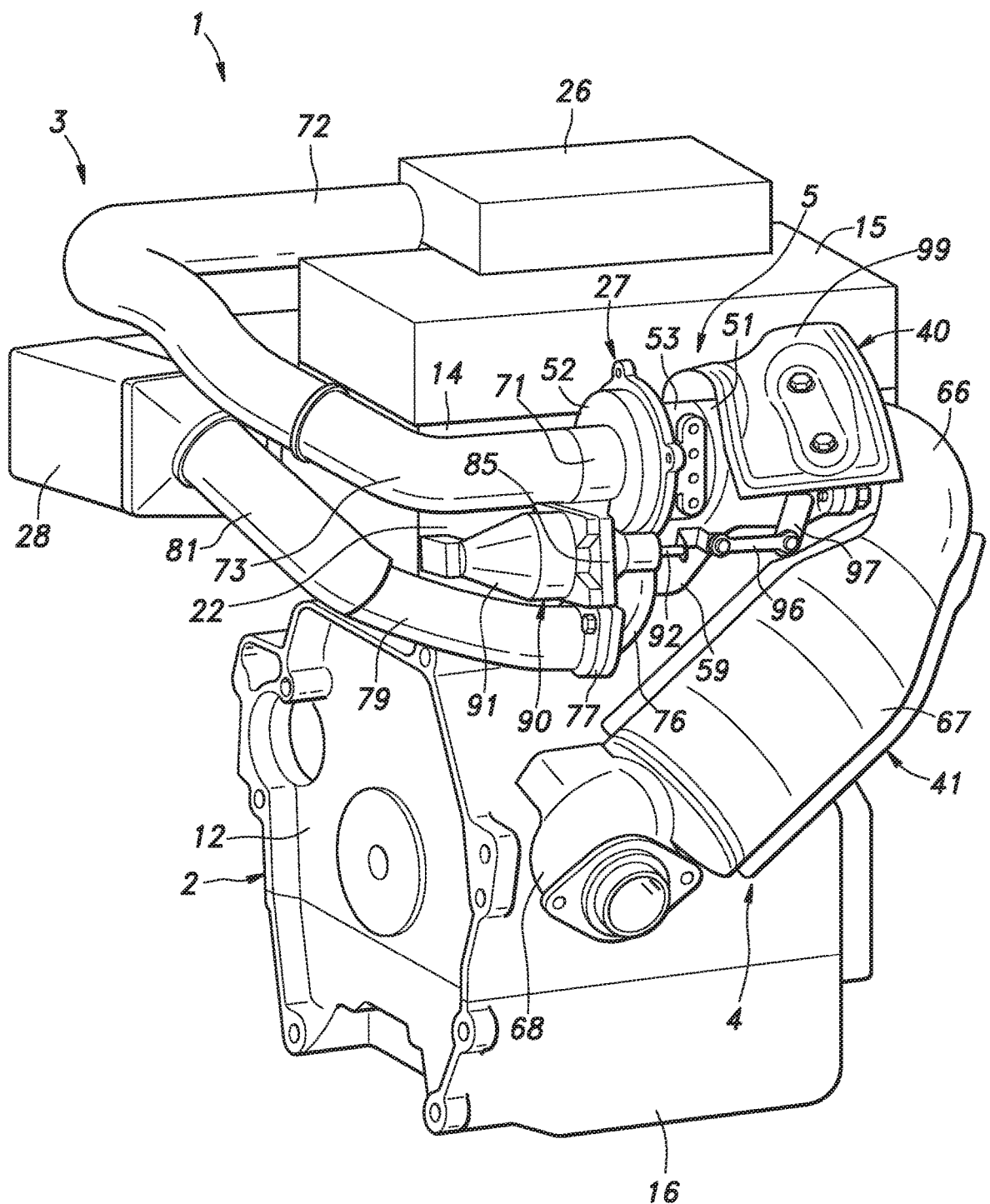
FIG. 2 is a perspective view of the internal combustion engine viewed from a left rear side.

As shown in FIGS. 1 and 2, the internal combustion engine 1 includes an engine main body 2, an intake device 3 for supplying intake air to the engine main body 2, an exhaust device 4 for expelling exhaust gas from the engine main body 2, and a turbocharger 5 provided in the intake device 3 and the exhaust device 4. The engine main body 2 comprises a cylinder block 12 in which a plurality of cylinders 11 are defined in series, a cylinder head 14 connected to the upper end of the cylinder block 12 and defining combustion chamber recesses 13 corresponding to the respective cylinders 11 therein, a head cover 15 provided on the upper end of the cylinder head 14, and an oil pan 16 connected to a lower end of the cylinder block 12. The engine main body 2 is transversely mounted on the vehicle body so that the cylinder row direction extends laterally.

As shown in FIG. 1, a plurality of intake ports 18 and a same number of exhaust ports 19 communicating with the respective combustion chamber recesses 13 are formed in the cylinder head 14. The intake ports 18 open on the front side 21 of the cylinder head 14. The exhaust ports 19 include a plurality of branch passages extending from the respective combustion chamber recesses 13, and the branch passages converge into a single passage that opens to the rear side 22 of the cylinder head 14.

The intake device 3 includes an air inlet 25, an air cleaner 26, a compressor 27 of the turbocharger 5, an intercooler 28, a throttle valve 29 and an intake manifold 30 which are connected via a series of passages in this order. The intake device 3 is attached to the front side 21 of the cylinder head 14 via the intake manifold 30.

The exhaust device 4 includes a turbine 40 of the turbocharger 5, a catalytic converter 41, a muffler 42, and an exhaust outlet 43 which are connected via a series of passages in that order from the upstream side. The exhaust device 4 is connected to the rear side 22 of the cylinder head 14 via the turbine 40.

The turbocharger 5 is provided with a turbine housing 51 consisting of an outer shell accommodating a turbine wheel 56 of the turbine 40 therein, a compressor housing 52 consisting of an outer shell accommodating a compressor wheel 57 of the compressor 27 therein, and a bearing housing 53 connected between the turbine housing 51 and the compressor housing 52. The turbine housing 51, the compressor housing 52, and the bearing housing 53 are each formed in a cylindrical shape and arranged coaxially with each other. The bearing housing 53 accommodates therein a bearing that rotatably supports a shaft 55. One end of the shaft 55 is coupled to the turbine wheel 56 received in the turbine housing 51, and the other end of the shaft 55 is coupled to the compressor wheel 57 received in the compressor housing 52. In other words, the turbine 40 and the compressor 27 are arranged in a coaxial relationship by being mounted on the common shaft 55. The central axial line of the shaft 55 is defined as the axis A of the turbocharger 5 (see FIG. 6). As shown in FIG. 2, the engine main body 2 is mounted transversely in the engine room of the vehicle with the exhaust side facing rearward, and the turbocharger 5 is disposed behind the engine main body 2 such that the axis A thereof extends in the lateral direction. In the present embodiment, the turbine 40 is disposed on the right side of the compressor 27.

Figure 5:
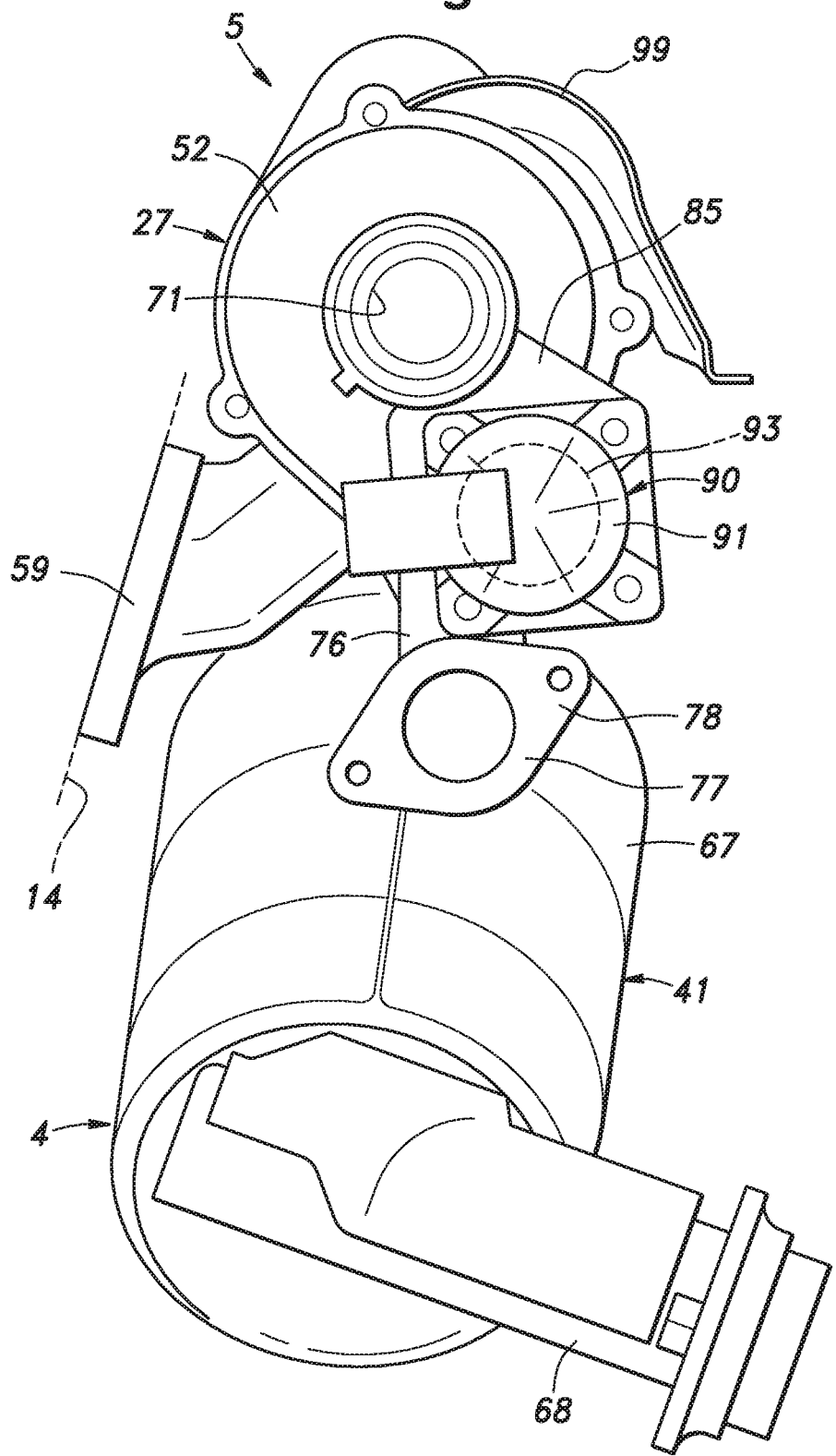
FIG. 5 is a left side view of the engine showing the positional relationship of a catalytic converter and an actuator to the turbocharger with piping and ducting omitted from illustration.
Figure 6:
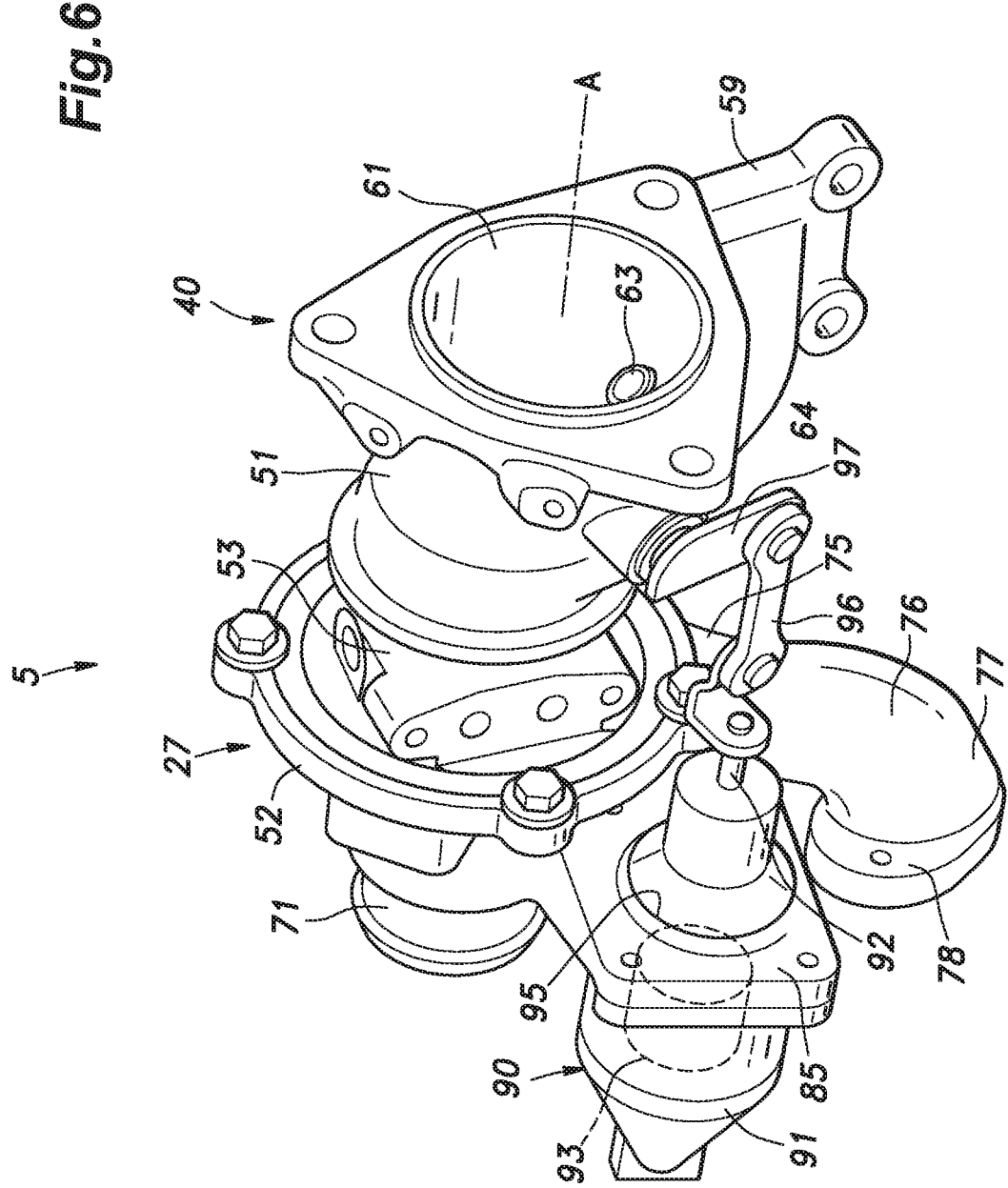
FIG. 6 is a perspective view of the turbocharger.

As shown in FIGS. 5 and 6, an exhaust inlet portion 59 of the turbine 40 is formed in a lower part of the outer periphery of the turbine housing 51. The exhaust inlet portion 59 is formed as a tubular portion extending forward in a tangential direction of the turbine housing 51. The front end of the exhaust inlet portion 59 is connected to a rear side 22 of the cylinder head 14 and is connected to the exhaust ports 19.

Figure 3:
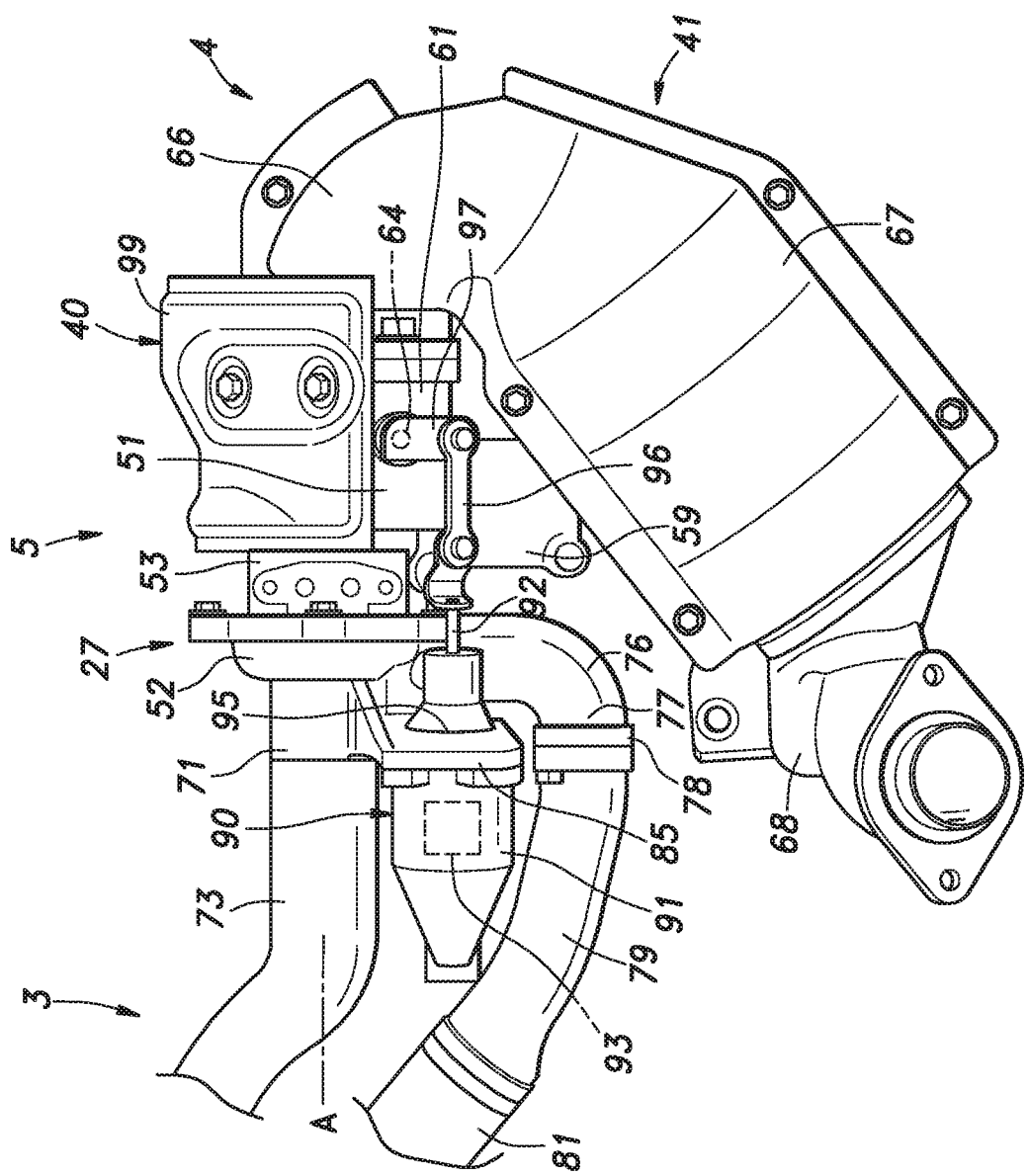
FIG. 3 is a fragmentary rear view of the engine showing a turbocharger provided therein.

As shown in FIGS. 3 and 6, an exhaust outlet portion 61 is provided in a central part of the end of the turbine housing 51 facing away from the compressor housing 52. The exhaust outlet portion 61 is formed in a tubular shape, and opens on the side (right side) facing away from the compressor housing 52. As shown in FIG. 1, a bypass passage 62 extending directly from the exhaust inlet portion 59 to the exhaust outlet portion 61 is formed in the turbine housing 51 so as to bypass the inner chamber of the turbine housing 51 receiving the turbine wheel 56. A wastegate valve 63 for opening and closing the bypass passage 62 is provided in the bypass passage 62. The wastegate valve 63 consists of a flap valve, and is provided with a valve shaft 64 that passes through the turbine housing 51 and projects rearward (see FIG. 6).

As shown in FIGS. 2 and 3, a catalytic converter 41 forming a part of an exhaust pipe is connected to the exhaust outlet portion 61. The catalytic converter 41 is provided with an inlet pipe portion 66, a main body portion 67, and an outlet pipe portion 68 in that order from the upstream side thereof. The catalytic converter 41 extends obliquely downward from the exhaust outlet portion 61 toward the compressor 27 (left side) behind the engine main body 2 and under the turbocharger 5. More specifically, the inlet pipe portion 66 extends axially from the exhaust outlet portion 61 and curves sharply downward and leftward. The main body portion 67 is provided with a cylindrical profile, and extends linearly and obliquely leftward from the inlet pipe portion 66 along the rear side of the engine main body 2. In other words, the main body portion 67 extends toward the side of the compressor 27 under the turbocharger 5. The outlet pipe portion 68 extends leftward and rearward from the downstream end of the main body portion 67 along a smoothly curved path.

The diameter of the main body portion 67 is larger than the diameter of the inlet pipe portion 66 and the outlet pipe portion 68. The main body portion 67 is internally provided with a three-way catalyst for removing hydrocarbons, carbon monoxide and nitrogen from the exhaust gas. As shown in FIG. 3, the upstream end (right end) of the main body portion 67 is disposed to the right of the turbine housing 51 as viewed from the rear, and the downstream end (left end) of the main body portion 67 is disposed under the compressor housing 52. As shown in FIG. 2, as viewed from the left side, the front end of the compressor 27 is disposed rearward of the front end of the main body portion 67, and the rear end of the compressor 27 is disposed forward of the rear end of the main body portion 67. In other words, when viewed from above, the main body portion 67 and the turbocharger 5 overlap with each other. In the illustrated embodiment, as viewed from above, the compressor 27 is entirely overlapping with the main body portion 67. Also, the main body portion 67 includes parts that are located under the turbine housing 51, the bearing housing 53, and the compressor housing 52.

As shown in FIG. 2 and FIG. 3, an intake inlet portion 71 is provided at the center portion of the end of the compressor housing 52 facing away from the turbine housing 51. The intake inlet portion 71 is formed in a tubular shape, and opens on the side (left side) facing away from the turbine 40. The intake inlet portion 71 is connected to the air cleaner 26 via a first and second duct 72 and 73. The air cleaner 26 is disposed above and on the front side of the head cover 15, and has an outlet on the left end. The first duct 72 extends to the left from the upstream end thereof connected to the outlet of the air cleaner 26, and then extends to the rear along the left end of the cylinder head 14. The second duct 73 extends rearward from the rear end of the first duct 72 along the left end of the cylinder head 14, and then extends to the right along the rear side of the cylinder head 14 before being connected to the intake inlet portion 71 at the downstream end thereof.

As shown in FIGS. 2 and 6, an intake outlet portion 75 is formed in a lower part of the outer periphery of the compressor housing 52, or in a peripheral part of the compressor housing 52 opposing the catalytic converter 41. The intake outlet portion 75 is defined by an upstream end of an extension pipe portion 76 extending downward in a tangential direction of the compressor housing 52. The extension pipe portion 76 is formed integrally with the compressor housing 52.

The connecting end 77 forming the downstream end of the extension pipe portion 76 is curved (to the left) away from the turbine 40, and is open toward the left. An annular fastening flange 78 extending radially outward is formed on the outer periphery of the connecting end 77. The extension pipe portion 76 forms a part of the intake pipe through which the intake air passes. As shown in FIG. 3, as viewed from the rear, the extension pipe portion 76 is disposed generally below the compressor housing 52, and above the outlet pipe portion 68 of the catalytic converter 41. As shown in FIG. 5, as viewed from the left, the extension pipe portion 76 is disposed below the compressor housing 52, and above the outlet pipe portion 68 of the catalytic converter 41. Further, the connecting end 77 of the extension pipe portion 76 is disposed between the compressor housing 52 and the outlet pipe portion 68 in a vertical direction. It is also possible to say that the connecting end 77 of the extension pipe portion 76 is between the upstream end (upper end) and the downstream end (lower end) of the main body portion 67 with respect to the vertical direction. Further, when viewed from above, the extension pipe portion 76 overlaps with the compressor housing 52 and the outlet pipe portion 68.

As shown in FIG. 2, a connecting pipe 79 forming a part of the intake pipe is connected to the connecting end 77 of the extension pipe portion 76. The connecting pipe 79 is made of metal, and fastened to the fastening flange 78 at the upstream end thereof. The connecting pipe 79 extends from the lower end part of the extension pipe portion 76 away from the side of the turbine 40 (to the left side), and obliquely upward along the side of the engine main body 2. The extension pipe portion 76 forms an upstream part of a high-pressure side intake pipe on the downstream side of the compressor 27, and the connecting pipe 79 forms a downstream part of the high-pressure side intake pipe. The upstream end (right end) of the connecting pipe 79 is positioned substantially directly above the outlet pipe portion 68. The downstream end (left end) of the connecting pipe 79 is positioned to the left of and above the outlet pipe portion 68.

The downstream end of the connecting pipe 79 is connected to an inlet of an intercooler 28 via a third duct 81. The intercooler 28 is water-cooled, and is disposed adjacent to the left end of the cylinder head 14, and under the first duct 72. The third duct 81 is disposed under the second duct 73 and the first duct 72, and extends leftward from the downstream end of the connecting pipe 79, and forward to the front of the cylinder head 14.

The outlet of the intercooler 28 is connected to a throttle valve 29 via a fourth duct 83. The throttle valve 29 is connected to an upstream end of an intake manifold 30.

As shown in FIGS. 2 and 6, a bracket 85 in a plate shape having a major plane extending perpendicularly to the axis A of the turbocharger 5 projects from the compressor housing 52. In particular, the bracket 85 is substantially rectangular in shape, and is connected to the compressor housing 52 at the upper edge and the front edge thereof. A fastening flange 78 provided in the connecting end 77 of the extension pipe portion 76 is positioned under the bracket 85 with a gap defined therebetween. The compressor housing 52, the extension pipe portion 76, the fastening flange 78, and the bracket 85 are integrally formed by casting or the like. The upper end of the bracket 85 is disposed below the axis A of the turbocharger 5. The width of the bracket 85 as measured in the fore and aft direction is larger than the outer diameter of the extension pipe portion 76.

An actuator 90 for opening and closing the wastegate valve 63 is attached to an opening 95 formed in the bracket 85. The actuator 90 includes a cylindrical case 91 attached to the opening 95 of the bracket 85, a drive rod 92 projecting from one end of the case 91 toward the turbine 41 and configured to selectively advance and withdraw in the axial direction, and a drive unit 93 provided inside the case 91 to provide a drive force that causes the drive rod 92 to advance and withdraw. In the present embodiment, the drive unit 93 is formed by a solenoid that produces the drive force owing to electric current supplied thereto. In another embodiment, the drive unit 93 may be formed by a diaphragm that produces the drive force owing to a pneumatic pressure applied thereto. The case 91 is attached to the bracket 85 such that at least a major part of the actuator 90 is disposed on the side of the bracket 85 remote from the turbine 40, whereby the drive unit 93 which is received in the case 91 is disposed on the side of the bracket 85 remote from the turbine 40. The drive rod 92 actuated by the drive unit 93 extends from the drive unit 93 through the opening 95 of the bracket 85 toward the turbine 41.

The free end of the drive rod 92 of the actuator 90 is connected to a valve shaft 64 of the wastegate valve 63 via a link 96 and a lever 97. The lever 97 is connected to the projecting end of the valve shaft 64 of the wastegate valve 63, and extends in the radial direction with respect to the valve shaft 64. The link 96 connects the free end of the lever 97 with the free end of the drive rod 92. Thus, when the drive rod 92 advances and retracts under the driving force produced by the drive unit 93, the lever 97 swings in the corresponding directions with the result that the wastegate valve 63 connected to the lever 97 rotates in the corresponding directions. In short, the actuator 90 controls the flow passage of the turbocharger 5 by controlling the wastegate valve 63 to open and close.

Figure 4:
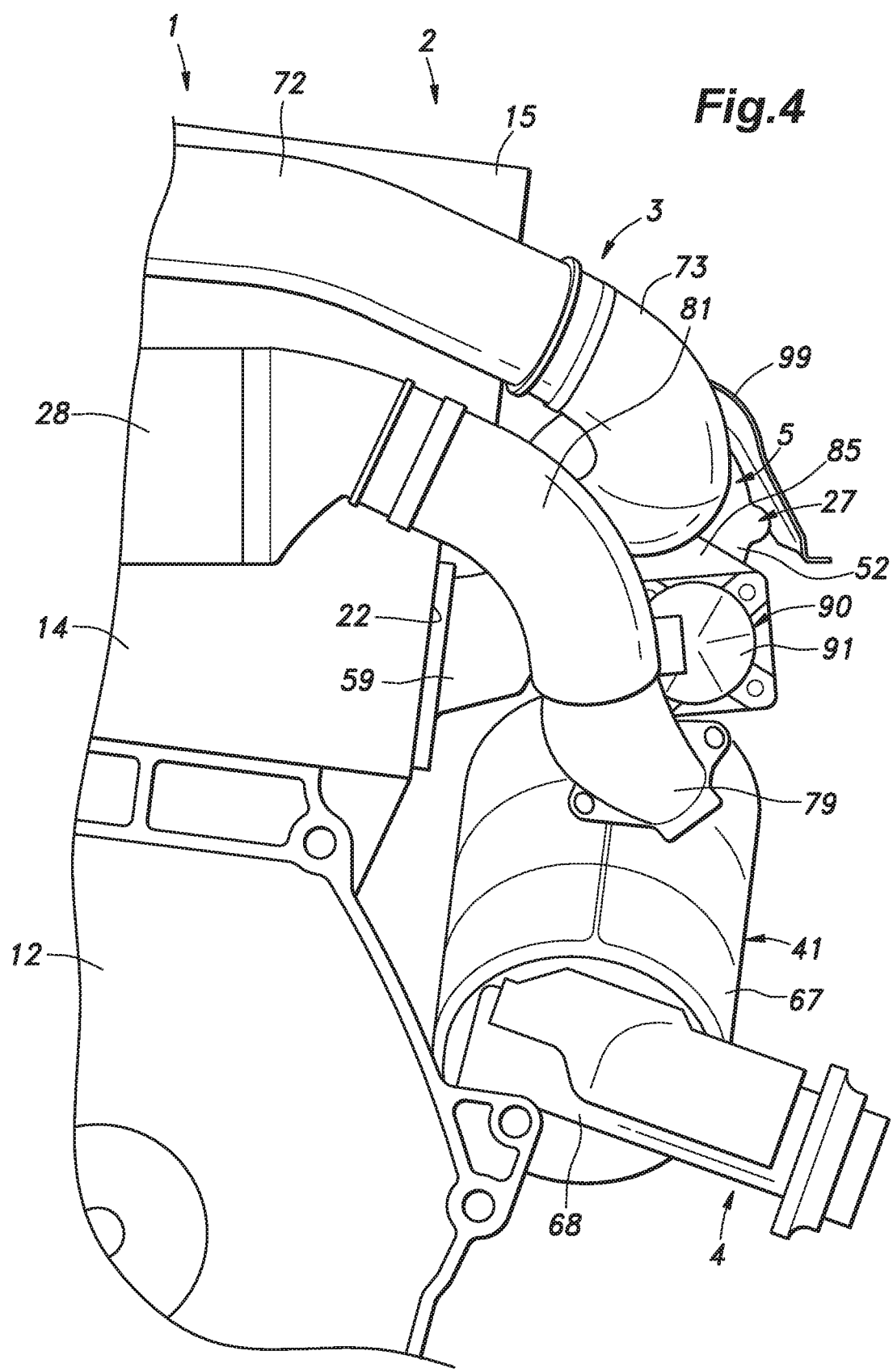
FIG. 4 is a fragmentary left side view of the engine.

As shown in FIG. 3, the actuator 90 is disposed between the compressor housing 52 and the part of the intake pipe including the connecting end 77 of the extension pipe portion 76 and the connecting pipe 79 with respect to the vertical direction. The actuator 90 is disposed on the side (left side) of the extension pipe portion 76 facing away from the turbine 40, and above the connecting pipe 79. As shown in FIGS. 4 and 5, the actuator 90 is arranged so as to overlap with the connecting end 77 of the extension pipe portion 76 and the connecting pipe 79 when viewed from above. In other words, the extension pipe portion 76 and the connecting pipe 79 extend through the space defined between the catalytic converter 41 and the actuator 90 so as to shield at least a part of the heat radiated from the catalytic converter 41 to the actuator 90. Here, that the extension pipe portion 76 and the connecting pipe 79 extend through the space defined between the catalytic converter 41 and the actuator 90 means that the extension pipe portion 76 and the connecting pipe 79 are located so as to block rays emanating from the catalytic converter 41 from reaching the actuator 90 in a substantial manner. Thus, in the illustrated embodiment, the extension pipe portion 76 and the connecting pipe 79 serve as a fluid pipe conducting fluid and extending through a space between the exhaust pipe (catalytic converter 41) and the actuator 90. The front edge of the case 91 of the actuator 90 is located behind the front side of the extension pipe portion 76 and the connecting pipe 79, and the rear edge of the case 91 of the actuator 90 is located in front of the rear side of the extension pipe portion 76 and the connecting pipe 79.

A cover 99 made of metal plate, and stamp formed into a semi-cylindrical shape is placed on the upper side of the turbine housing 51 with the concave side of the cover 99 facing the turbine housing 51 and the axial direction of the cover 99 coinciding with or in parallel with the axis A of the turbocharger 5. The cover 99 is fastened to the turbine housing 51 by bolts. A gap is defined between the cover 99 and the turbine housing 51 except for the fastening portions.

According to the internal combustion engine 1 of the illustrated embodiment, since the extension pipe portion 76 and the connecting pipe 79 are disposed between the catalytic converter 41 which forms a part of the exhaust pipe, and the actuator 90, at least a part of the heat radiated from the catalytic converter 41 is blocked from reaching the actuator 90 by the extension pipe portion 76 and the connecting pipe 79. As a result, the actuator 90 is prevented from being heated excessively.

Since the extension pipe portion 76 and the connecting pipe 79 exchanges heat with the air flowing therein, an excessive temperature rise of the extension pipe portion 76 and the connecting pipe 79 can be avoided. The air flowing through the extension pipe portion 76 and the connecting pipe 79 is at a relatively high temperature as a result of compression by the compressor 27. The air having flowed through the extension pipe portion 76 and the connecting pipe 79 is cooled by the intercooler 28 provided on the downstream side thereof.

Since the actuator 90 is disposed on the side of the extension pipe portion 76 facing away from (on the left side of) the turbine 40, and above the connecting pipe 79, the extension pipe portion 76 and the connecting pipe 79 are arranged adjacent to the side of the actuator 90 facing the catalytic converter 41. Therefore, most of the heat radiated from the catalytic converter 41 is shielded by the extension pipe portion 76 and the connecting pipe 79 so that the amount of heat transferred to the actuator 90 can be minimized.

Since a large part of the actuator 90 is disposed on the side (left side) of the bracket 85 remote from the turbine 40, the heat radiated from the catalytic converter 41 is favorably shielded by the bracket 85. As a result, the temperature rise of the actuator 90 can be minimized. Since the drive unit 93 which may be the most vulnerable part of the actuator 90 is disposed on the left side of the bracket 85, the drive unit 93 is favorably protected from the heat of the catalytic converter 41.

Since the bracket 85 is integrally formed with the compressor housing 52, the heat received by the bracket 85 can be transmitted to the compressor housing 52 so that the temperature rise of the bracket 85 can be minimized. Further, since a gap is defined between the extension pipe portion 76 disposed on side of the catalytic converter 41 and the bracket 85, and they are not in contact with each other, heat transfer from the extension pipe portion 76 to the bracket 85 can be minimized, and an excessive temperature rise in the bracket 85 and the actuator 90 can be avoided.

Although the present invention has been described in terms of a specific embodiment, the present invention is not limited by the illustrated embodiment, but can be modified and substituted without departing from the spirit of the present invention. For example, in place of the wastegate valve 63, the actuator 90 may be configured to drive any other components of the turbocharger such as the vanes of a variable-nozzle turbocharger.

The fluid pipe disposed between the actuator 90 and the exhaust pipe including the catalytic converter 41 is not limited to the extension pipe portion 76 and the connecting pipe 79, but may be any other pipe conducting fluid. The fluid pipe may be, for example, a low pressure side intake pipe connected to the intake inlet portion 71 of the compressor 27. Also, the fluid pipe is not limited to an intake pipe through which air flows, but may also be a pipe for conducting water such as cooling water. The fluid pipe may be, for example, a water pipe connecting a water jacket of the engine main body 2 with a water jacket formed in the bearing housing 53, or a water pipe connecting a water jacket of the engine main body 2 with a radiator.

The invention claimed is:

1. An internal combustion engine equipped with a turbocharger, the turbocharger including a turbine and a compressor that are arranged in a coaxial relationship, the internal combustion engine comprising:
    an exhaust pipe extending obliquely downward from an outlet of the turbine toward the compressor and passing under the compressor;
    an actuator attached to a part of the compressor for controlling a flow path of the turbocharger, the actuator being disposed under the compressor and above the exhaust pipe; and
    a fluid pipe conducting fluid and extending through a space defined between the exhaust pipe and the actuator.

2. The internal combustion engine as defined in claim 1, wherein the fluid pipe is an intake pipe connected to an outlet of the compressor.

3. The internal combustion engine as defined in claim 2, wherein
    the intake pipe includes an upstream part extending downward from the outlet of the compressor, and a downstream part extending away from the turbine, the actuator being positioned above the downstream part and on a side of the upstream part remote from the turbine.

4. The internal combustion engine as defined in claim 3, wherein the turbocharger comprises a turbine housing accommodating a turbine wheel of the turbine therein and a compressor housing accommodating a compressor wheel of the compressor therein, and wherein the upstream part of the intake pipe consists of a tubular part integrally formed with the compressor housing, and the actuator is supported by the compressor housing via a bracket integrally formed with the compressor housing.

5. The internal combustion engine as defined in claim 4, wherein the actuator includes a case attached to the bracket of the compressor housing, a drive rod extending from the case toward the turbine, and a drive unit received in the case and configured to axially actuate the drive rod, the bracket comprising a plate member having a major plane extending substantially perpendicularly to an axial line of the turbocharger, the case being attached to the bracket such that the drive unit is disposed on a side of the bracket remote from the turbine.

6. The internal combustion engine as defined in claim 5, wherein the bracket has an opening formed therein, and the case of the actuator is attached to the opening of the bracket, the drive rod of the actuator extending through the opening from the drive unit toward the turbine.

7. The internal combustion engine as defined in claim 1, wherein the exhaust pipe includes a catalytic converter.

8. The internal combustion engine as defined in claim 5, wherein an end of the drive rod remote from the case is connected to a wastegate valve of the turbine.

* * * * *